(No Model.)

A. W. VON SCHMIDT.
ROTARY PLOW FOR SUBMARINE WORK.

No. 306,368. Patented Oct. 7, 1884.

Witnesses:

Inventor:
Alexey W. Von Schmidt
By his Attorney.

UNITED STATES PATENT OFFICE.

ALLEXEY W. VON SCHMIDT, OF SAN FRANCISCO, CALIFORNIA.

ROTARY PLOW FOR SUBMARINE WORK.

SPECIFICATION forming part of Letters Patent No. 306,368, dated October 7, 1884.

Application filed May 6, 1884. (No model.)

*To all whom it may concern:*

Be it known that I, ALLEXEY W. VON SCHMIDT, a citizen of the United States, residing at San Francisco, California, have invented new and useful Improvements in Rotary Plows for Submarine Work, of which the following is a specification.

My invention relates to certain new and useful improvements in plows for submarine work, designed for agitating material to be carried off by a current of water.

The invention is an improvement upon the plow described in Letters Patent No. 277,177, granted me May 8, 1883, and is intended to be supported and operated in substantially the same manner as the plow described in that patent. In the operation of plows of this character as heretofore constructed considerable difficulty has been experienced by reason of the liability of their becoming clogged with grass, roots, or the like, and the object of the present invention is to produce a plow which will cut such substances into a convenient form for removal.

The invention consists of a plow of the general form of that shown in the patent referred to, having its ring-frame provided with a series of knives arranged to cut the vegetable growth that may be in the way and retard the motion of the plow.

In order that those skilled in the art may know how to make and use my improved plow, I will now proceed to minutely describe the same in connection with the accompanying drawings, in which—

Figure 2:
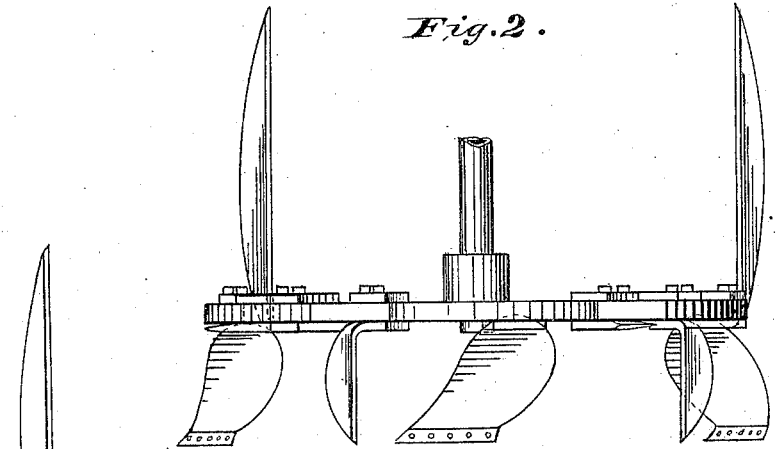
Figure 3:
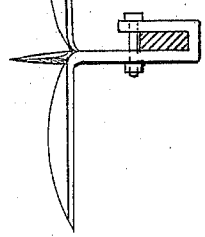
Figure 4:
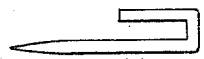
Figure 1:
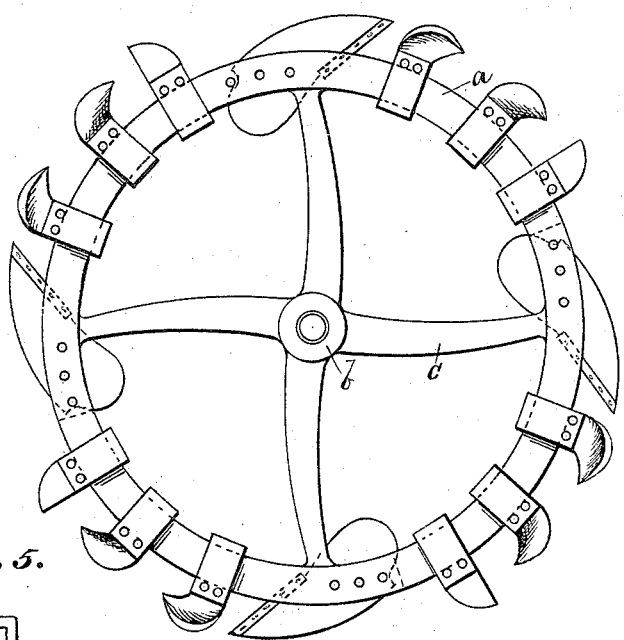
Figure 5:
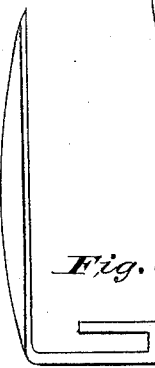

Figure 1 is a plan view of the plow, showing the form and arrangement of the cutting-blades. Fig. 2 is a side view of the same, and Fig. 3 is a perspective view of a modified form of cutting-blades. Figs. 4 and 5 are details of cutters.

Like letters represent like parts in the several figures, and reference may be made to the above-mentioned patent for a clear understanding of the relative position and the operation of the plow.

A represents the body of the plow, which is composed of a metal ring, $a$, joined to a central perforated hub, $b$, by means of the arms or spokes $c$.

To the ring $a$ are secured a number of plows, the purpose of which is to concentrate the dredging material and direct it into a position to be acted upon by a current of water to convey it to a place of deposit. Secured at any suitable distance in front of each of these plows are three knives, one projecting upward, one downward, and the third laterally from the ring $a$, so that any obstruction of a vegetable nature may be cut into convenient form for removal. The preferred form of knife is that shown in Fig. 1—that is, one provided with a shank bent upon itself to form a loop for inclosing the ring, and adapted to be secured to the same by a clamping-screw.

A modified form of knife is shown in Fig. 3 of the drawings. In this form the knives are formed all together, and provided with a common shank for attaching them to the ring, from which shank the blades extend in three directions, to accomplish the same purpose as the three independent knives.

Having thus described my invention, what I claim is—

1. The combination, with the ring $a$ of a plow of the kind specified, of a cutting-knife, substantially as and for the purpose set forth.

2. The combination, with the ring $a$, carrying plows, of the knives arranged in front of said plows, and extending upwardly, downwardly, and laterally from the ring $a$, substantially as described.

3. The combination, with the ring $a$, carrying the plows, of cutting-blades, three of such being secured to the ring in front of each plow, and projecting, one upwardly, one downwardly, and one laterally, substantially as described.

In testimony whereof I have hereunto set my hand in the presence of two subscribing witnesses.

ALLEXEY W. VON SCHMIDT.

Witnesses:
EDWD. CHATTIN,
SAMUEL THORN.